Feb. 8, 1949.   W. M. FORSYTHE ET AL   2,461,205
ROPE CLAMP
Filed June 2, 1945
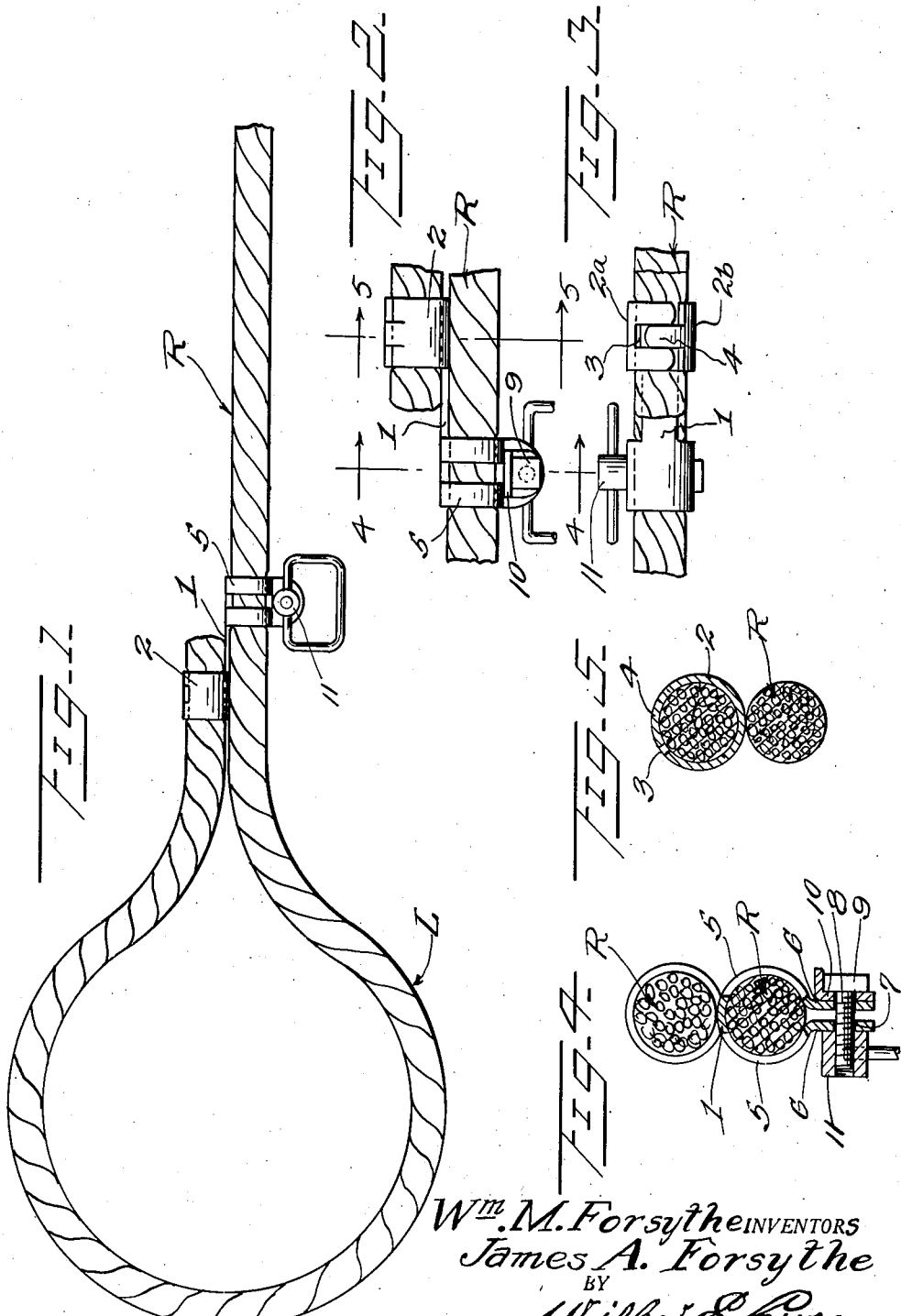
Wᵐ. M. Forsythe
James A. Forsythe  INVENTORS
BY
Wilfred E. Lawson
Attorney Patented Feb. 8, 1949

2,461,205

UNITED STATES PATENT OFFICE 2,461,205

ROPE CLAMP

William M. Forsythe and James A. Forsythe, Dubach, La.

Application June 2, 1945, Serial No. 597,238

1 Claim. (Cl. 24—81)

This invention relates to a rope clamp and it is primarily an object of the invention to provide a clamp of this kind whereby a rope or kindred flexible member may be so formed as to provide a loop of desired size such as may be required in a halter or the like.

Another object of the invention is to provide a clamp of the character described wherein the rope-engaging elements constitute a single unit, together with means whereby one of said units may be releasably held to a rope or the like.

The invention consists in the details of construction and in the combination and arrangement of the several parts of our improved rope clamp whereby certain important advantages are attained, as will be hereinafter more fully set forth.

In order that our invention may be better understood, we will now proceed to describe the same with reference to the accompanying drawings, wherein:

Figure 1 is a view in side elevation of a clamp constructed in accordance with an embodiment of the invention and in applied position;

Figure 2 is a fragmentary view in elevation opposite to that illustrated in Figure 1;

Figure 3 is a view in top plan of the clamp as illustrated in Figure 2;

Figure 4 is a sectional view taken substantially on the line 4—4 of Figure 2; and Figure 5 is a sectional view taken substantially on the line 5—5 of Figure 2.

In the embodiment of the invention as illustrated in the accompanying drawings, the clamp comprises an elongated body member 1 of desired dimensions and which is provided at one end portion with a collar 2 consisting of two oppositely directed and laterally disposed wings 2a and 2b adapted to tightly surround an end portion of a rope R or kindred flexible member and to be fixedly engaged therewith.

In the present embodiment of the invention, the outer end portion of one of the wings, such as the wing 2a is provided with an open slot 3 in which is received a tongue 4 carried by the end of the coacting wing 2b. This arrangement permits the desired constriction of the collar 2 around the rope R to assure effective anchorage.

The opposite end portion of the body member 1 has extending laterally from the opposite sides thereof the semi-circular arms 5, the arms 5 at each side being slightly spaced from each other. These arms 5 are of proper curvature as to readily embrace a portion of the rope R and possess sufficient inherent resiliency to swing outwardly a distance sufficient to allow the rope R to be slid therebetween in order to adjust the size of a halter loop L or the like as may be desired.

The outer ends of the arms 5 are integral with the outstanding plates 6 which are in spaced opposed relation and which provide means whereby the arms 5 may be tightly moved into desired clamping or holding engagement with the rope R.

In the present embodiment of the invention, these plates 6 in the central portions thereof are provided with the openings 7 through which is directed the shank of a headed bolt 8. Interposed between the head 9 of the bolt 8 and one of the plates 6 is a conventional holding washer 10 while the free end portion of the bolt 8 has threaded thereon a nut 11 of a speed type, whereby a quick clamping or releasing of the arms 5 with respect to the rope R may be accomplished when desired.

It is to be noted that the arms 5 are extended from the body member 1 in a direction opposite to that of the wings 2.

From the foregoing description it is thought to be obvious that a rope clamp constructed in accordance with our invention is particularly well adapted for use by reason of the convenience and facility with which it may be assembled and operated.

We claim:

A rope clamp comprising a clamping collar consisting of two substantially semi-circular wings, a tongue forming a longitudinal continuation of the end of one wing, the other wing having a longitudinal slot in which the tongue is received, a relatively long flat body forming an integral continuation of one side edge of the collar midway between the ends of the wings, a pair of substantially semi-circular arms integral with the body at the end remote from the collar, the arms being directed oppositely from the wings of the collar and being disposed in cooperative relation to receive and encircle a rope body, the ends of the arms terminating in spaced parallel plates, a threaded bolt extending transversely through and connecting said plates and connected at one end to a plate to be held against turning, and a nut threaded upon the other end of the bolt.

WILLIAM M. FORSYTHE.

his
JAMES A. X FORSYTHE.
mark

Witness to mark:
H. C. MILLER.

(References on following page)

REFERENCES CITED

The following references are of record in the file of this patent:

UNITED STATES PATENTS

| Number | Name | Date |
|---|---|---|
| 478,092 | Cushman | July 5, 1892 |
| 986,890 | Archibald | Mar. 14, 1911 |
| 1,282,511 | Williams et al. | Oct. 22, 1918 |
| 1,676,387 | De Lorme | July 10, 1928 |
| 2,014,634 | Polgov | Sept. 17, 1935 |

FOREIGN PATENTS

| Number | Country | Date |
|---|---|---|
| 109,050 | Australia | Nov. 23, 1939 |